Dec. 14, 1937.  B. E. HOWELL ET AL  2,102,461
BRAKE CONTROLLING APPLIANCE
Filed July 29, 1935   2 Sheets-Sheet 1

Inventors
B. E. Howell
W. S. McKnight.
Hiram A. Sturges
Attorney

Dec. 14, 1937.  B. E. HOWELL ET AL  2,102,461
BRAKE CONTROLLING APPLIANCE
Filed July 29, 1935  2 Sheets-Sheet 2

Inventors
B. E. Howell
W. S. McKnight
By Hiram A. Sturges
Attorney

Patented Dec. 14, 1937

2,102,461

UNITED STATES PATENT OFFICE 2,102,461

BRAKE CONTROLLING APPLIANCE

Bernard E. Howell and Walter S. McKnight, Council Bluffs, Iowa

Application July 29, 1935, Serial No. 33,700

7 Claims. (Cl. 188—152)

This invention relates to a brake controlling appliance for motor vehicles, the objects in view being to provide more effective and convenient means, and means which will operate with greater certainty for controlling the wheel brakes than usually employed.

It is an object to provide a braking means which will operate without the use of hand levers or extra foot treadles, to thereby avoid the confusion and mismanagement and resulting accidents which often occur.

The new and useful features of the invention are claimed and fully explained in connection with accompanying drawings, which show one embodiment of the invention, and it will be understood that changes may be made in form, size, proportions and minor details of construction, said changes being within the scope of the invention as claimed.

In the drawings, Fig. 1 is a view of a gas engine in side elevation showing brake rods and controlling means for said rods.

Figure 1:
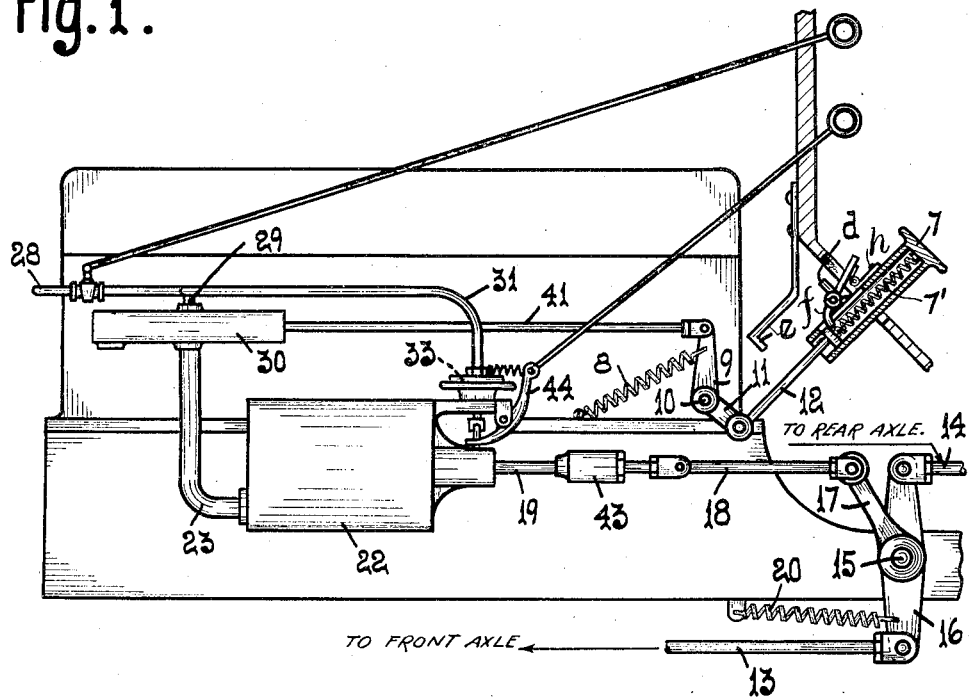

Referring now to the drawings for a more particular description, the gas supply for operating the engine and control for applying the brakes are both operated by use of a single element.

While this operating element might consist of any suitable movable part it is represented in Fig. 1 of the drawings as a treadle plunger or foot-pedal 7 under control of a spring 8, said spring being attached to an arm 9 of a bellcrank having a pivotal mounting 10 and the other arm 11 of the bellcrank being attached to a connecting-rod 12 which leads to the plunger or treadle 7.

This treadle is suitably mounted for reciprocation as shown in Fig. 1, and is of tubular form for purposes later to be described, and in use, a downward movement thereof will cause operation of the engine, and a termination of said downward pressure will cause seating of the brakes, the treadle moving upwardly by action of the spring 8.

This single treadle for a double use has been found to be of great advantage since its construction is simple and inexpensive. Also it is more convenient in use than other structures, and it operates as a safety device. The simple act of removing the foot from the treadle will cause the brakes to operate without further attention of a driver.

The automatic operation of braking to be described depends simply upon releasing the pedal 7. As shown in Fig. 1, numeral 13 indicates a brake rod leading to the brake shoes (not shown) for the front wheels of the vehicle and at 14 is a brake rod leading to the brake shoes of the rear wheels, the usual horizontal shaft 15 being shown upon which is keyed the rock arm 16.

Numeral 17 indicates an arm which, at one of its ends is keyed upon the shaft 15, its opposite end being pivotally connected with the coupling-rod 18 of a piston-rod 19.

Any movement of the piston-rod 19 will therefore move the brake rods, subject to the resistance of a spring 20, this spring normally tending to prevent the brake-shoes from engaging the brake drums.

The piston for the rod 19 is indicated at 21, the cylinder in which the piston may be reciprocated being indicated at 22, the outlet suction-pipe for the cylinder being indicated at 23.

Figure 2:
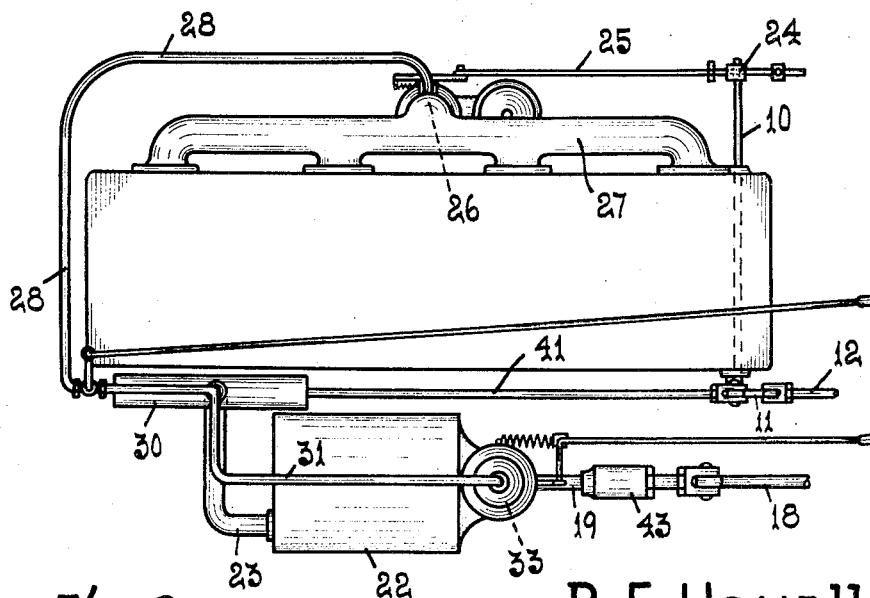
Fig. 2 is a plan view of the engine and brake controlling means.

As shown in Figs. 1 and 2, the mounting of the bellcrank is upon member 10, this being a horizontal operating-shaft and at that side of the engine opposite to the bellcrank and mounted upon the end of the shaft 10 is a crank-arm 24 of a link 25, and a rearward movement of the rod 25 opens a valve 26 to permit gas to move into the motor.

Figure 4:
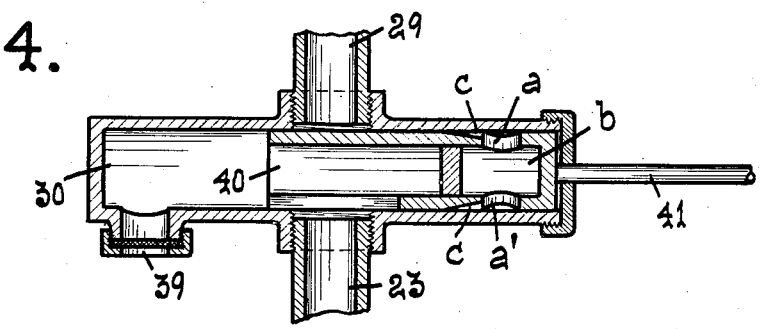
Fig. 4 is a sectional view of a suction-control slide-valve.

This pipe 28 is in communication with the intake manifold 27, and has a short leader 29 (Figs. 1, 2, 4) which may communicate with a valve housing 30 best shown in Fig. 4, and a second leader for the suction-pipe 28 is indicated at 31.

This pipe 31 communicates with a vacuum cylinder 32 in which is mounted a diaphragm 33.

A piston in the cylinder 32 is indicated at 34 having a stem 35, said stem being provided with a latch-pin 36, said latch-pin being disposed in suitable bearings for its limited movements and being pivotally mounted on the end of the piston stem 34, and it will be understood that suction, during operation of the engine will cause the piston 34 together with the diaphragm and contact-pin or latch 36 to move outwardly from the piston rod 19 subject to the resistance of a spring 37 which is disposed in the cylinder 32. The piston rod 19 is provided with notches 38 adapted to be engaged by the pin or latch 36. By action of the spring 37 the latch will be pressed against the piston rod 19 and may engage in the notches to prevent a movement of said rod in one direction.

It will be understood that by force of spring 20 the brakes are under control to permit free rotation of the vehicle wheels and that, when pressure is removed from the foot pedal 7 the brakes will operate to prevent rotation of said wheels by action of the piston 21 in the brake-cylinder 22.

Since the force of suction is greater than the resistance or force of the spring 20, a downward movement of the foot pedal will instantly lift the brakes.

It is obvious that, during the absence of suction, the piston 21 will move, by action of the spring 20 toward that end of the cylinder 22 upon which the release valves $x$ are mounted.

The valve housing 30 is in communication with the suction pipe 23 and is provided with a port 39 at one of its ends, and at 40 is indicated a valve-element which is provided with a pair of ports $a$ and $a'$ opening on a chamber $b$, and the piston rod 41 for this piston is mounted on the arm 9 of the bellcrank.

When the pressure on the foot pedal is removed and moves upwardly by action of the spring 8 the valve rod 41 will move forwardly of the engine and the ports $a$ and $a'$ of the piston 40 will be disposed in register with the pipes 23 and 29 and suction will cause the piston 21 to move.

Figure 5:
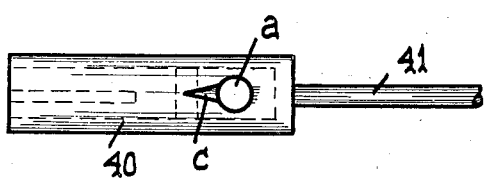
Fig. 5 is a plan view of the piston for the cylinder illustrated in Fig. 4, to show a slot opening on a suction port.

In order to avoid an undue or excessive shock when the brakes are applied, the valve-element 40 (Fig. 5) is provided with slots $c$ which open on the ports $a$ and $a'$, the result being that when the piston 40 moves forwardly in the cylinder 30, as mentioned, the piston 21 and its piston rod 19 will, at that instant, have a retarded movement and undue shocks will be avoided.

It will be understood that the latch-pin 36 will engage in one of the notches 42 at all times when the motor is not running, said latch-pin being pressed into that position by action of the spring 37.

One function discharged by the latch-pin 36 is the maintenance of the brakes in engaged position when the foot treadle 7 has been released. This latch-pin normally engages the piston-rod 19 by action of spring 37, but when the motor is running the force of suction in cylinder 32 is greater than the force of the spring 37, and the latch-pin will be disengaged from the notch 42, and by action of spring 20 the brake rods will move to inoperative position.

Figure 3:
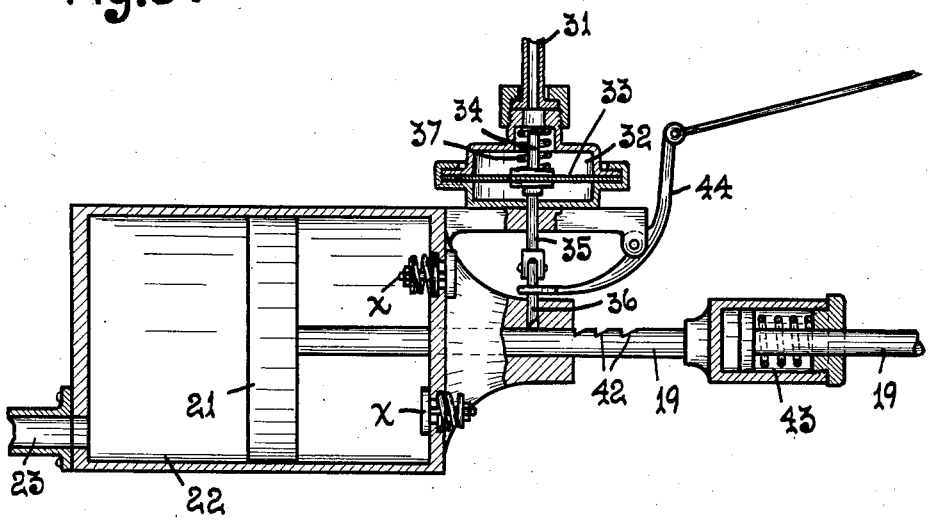
Fig. 3 is a sectional detail showing a movable piston and coupling-rod, the latter being under control of a diaphragm.

Suction is depended upon for applying the brakes. When the driver accelerates the motor by pressing the treadle 7 downwardly or forwardly, the suction-control valve-member 40 will be disposed with its chamber $b$ in non-register with the suction-pipes 23 and 29 so that no force of suction will move the piston 21, and at that time the diaphragm 33, by force of suction will lift the latch-pin from its engagement with the notch 42 to permit the sliding movement of the piston rod 19, as mentioned, to the position shown in Fig. 3.

It will be understood that the movement of the rod 25, as explained, causes feeding of gas to the engine.

Numeral 43 indicates a flexible joint arranged for the piston rod 19, tending to prevent shocks when the brakes are applied.

Numeral 44 indicates a lever arranged for disengaging the pin 36 from the piston rod 19 in instances when it is not convenient to start the engine, or in cases of emergency.

Figure 6:
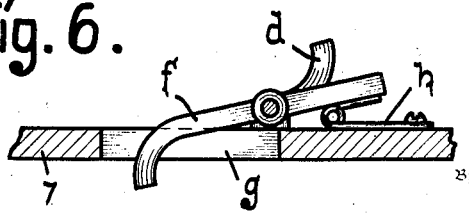
Fig. 6 is an enlarged detail view relating to Fig. 1, showing a releasable latch.

It will be understood that if the foot pedal, by accident or otherwise, is pushed inwardly an excessive distance, the lug $d$ will engage a stop-member $e$ which is secured to the dash of the vehicle, the result being the latch $f$ will be lifted out from the slot $g$ of the tubular plunger or pedal 7, and the latter may slide downwardly on the rod 12. As best shown in Fig. 6, a spring $h$ operates to normally maintain the latch $f$ in said slot.

It will be noted that the pressure-member or foot pedal 7, of tubular form, contains a helical spring 7', one end of which rests against the head of the rod 12, and when said member 7 has been moved to the excessive distance mentioned, the spring 8 will cause said foot pedal to move upwardly to its normal position, said spring being stronger than the spring 7', and it is obvious that the spring 7' will be compressed when it encounters the head of the rod 12, and that at the time of said compression the brakes will be applied. Also it is obvious that, by action of the spring 7' the tubular treadle 7 will be pushed outwardly to its position shown in Fig. 1, the latch $f$ moving into the slot $g$ by action of the spring $h$. It will be understood that when the spring 7' is compressed the head of the rod 12 will be disposed inwardly of the curved end of the latch $f$ and that, by action of the spring 7' the treadle 7 will move outwardly relative to the rod 12, the head of said rod forcibly engaging the curved end of the latch $f$, the latter being moved outwardly of the slot $g$ to permit the head of said rod 12 to be disposed in its normal position, said latch $f$ moving into the slot $g$, as mentioned, by action of the spring $h$.

The object in view for this last described feature is to provide two separate means for causing the brakes to be applied. Since no extra levers or pedals are provided, the single treadle 7 is depended upon, and it is obvious from the description that if the treadle 7 is disposed in its uppermost position by action of the spring 8 the brakes will be applied, and also if the treadle 7 is pushed downwardly to its limit of movement the brakes will be applied, this double function for the single treadle being a matter of convenience to the driver and operating as a "fool proof" arrangement for a new driver who has had a habit of pressing a pedal for a stop movement of a motor vehicle. In the use of the present invention, a good driver, for applying the brakes simply permits the treadle, by action of the spring 8, to move to its uppermost position as shown in Fig. 1 of the drawings.

The use of the herein described appliance will be appreciated since the control for driving is centered upon a single foot-piece, which also operates as a safety device. If the foot of the driver is removed the vehicle will immediately come to a stop, and this is considered to be an important feature of the invention.

We claim as our invention:—

1. In brake rod appliances for a motor vehicle, said motor having an intake manifold and a control-valve for fuel, resilient means normally maintaining the brake rods in inoperative position, a spring controlled bell-crank provided centrally with an operating-shaft, a link connected with the control-valve and having a connection with the operating-shaft, a valve housing, a suction-control valve in the valve housing having a rod mounted on the bell-crank, a brake-cylinder having a suction pipe communicating with the intake manifold subject to the control of the suction-control valve, a piston in the brake-cylinder having a rod connected with the brake rods, a vacuum chamber having a suction pipe in communication with the intake manifold, a spring-controlled piston in said chamber having a rod secured thereto, a latch-pin pivoted to said rod and normally engaging the rod of the first named piston, and a treadle connected and movable in one direction for moving the bell-crank to cause opening of the fuel control valve and to permit a movement of said spring-controlled piston to cause disengagement of the latch-pin from the piston rod of said first named piston, said treadle being movable in a reverse direction for actuating the bell-crank and suction-control valve to permit actuation of the piston in the brake cylinder, by force of suction, for moving the brake rods to operative position, the fuel control-valve moving to closed position.

2. In brake rod appliances for a motor vehicle provided with a stop-member, said motor having an intake manifold and a control-valve for fuel, a tubular treadle provided with a slot, a spring-controlled, pivotally mounted latch on the treadle normally engaging in said slot, a helical spring in the treadle normally abutting upon the latch, a spring-controlled bell-crank, a coupling-rod mounted on the bell-crank and engaging in the treadle, and resilient means for normally maintaining the brake rods in inoperative position, said treadle being movable in one direction for moving the control valve to open position and movable in a reverse direction for moving the brake rods to operative position, said treadle being movable in one direction a sufficient distance to cause the latch to engage said stop-member, whereby the latch will be removed from said slot to permit the coupling-rod to move into the treadle against the force of the helical spring to cause a movement of said treadle in a reverse direction, for maintaining the control-valve in closed position and for maintaining the brake rods in operative position.

3. In brake rod appliances for a motor vehicle, said motor having an intake manifold and fuel-control valve, spring-means normally maintaining the brake rods in inoperative position, an operating-shaft having a connection with the fuel-control valve, a bell-crank mounted on the operating-shaft, a brake-cylinder, a piston in the brake-cylinder having a piston rod resiliently connected with the brake-rods, a valve-housing having suction-pipes leading therefrom and providing normal communication of the intake manifold with the brake-cylinder, a suction-control valve-member in the valve-housing for controlling a communication of the intake manifold with said brake-cylinder and having a rod mounted on the bell-crank, a vacuum-cylinder in communication with the intake manifold and provided with a diaphragm, a spring-controlled latch-pin carried by the diaphragm for engaging the piston rod, and a treadle connected with the bell-crank and movable in one direction to cause actuation of said bell-crank, the fuel-control valve moving to open position, the suction-control valve member moving in the valve-housing to terminate the communication of the brake-cylinder with the intake manifold, and the diaphragm being moved for disengagement of the latch-pin from said piston rod.

4. In brake rod appliances for a motor vehicle provided with a fuel-control valve, an intake manifold and spring-controlled means for normally moving the brake rods to inoperative position, a spring-controlled bell-crank having a connection for controlling the fuel-control valve, a brake-cylinder, a valve-housing having normally communicating suction pipes leading to the intake manifold and brake-cylinder, a hollow suction-control valve member in the valve-housing having opposed apertures normally disposed in register with the suction pipes and having a rod mounted on the bell-crank, a piston in the brake-cylinder having a piston-rod provided with notches at longitudinal intervals and attached to the brake rods, a vacuum-cylinder in communication with the intake manifold and provided with a diaphragm, a spring-controlled latch-pin carried by the diaphragm normally engaging a notch of the piston-rod, and a treadle connected with the bell-crank adapted to be moved in one direction to cause coincident actuation of the fuel-control valve and disengagement of the latch-pin from said notch, the suction-control valve-member moving in the valve-housing to prevent relative communication of the suction-pipes.

5. In brake rod appliances for a motor vehicle provided with a fuel-control valve, an intake manifold and spring-controlled means for normally moving the brake rods to inoperative position, a spring-controlled bell-crank having a connection for controlling the fuel-control valve, a brake-cylinder, a valve-housing having suction pipes normally in communication relative to each other leading to the intake manifold and brake-cylinder, a hollow suction-control valve member in the valve-housing having opposed apertures and having a rod mounted on the bell-crank, a piston in the brake-cylinder having a notched piston rod attached to the brake rods, a diaphragm-cylinder in communication with the intake manifold and provided with a diaphragm, a spring-controlled latch-pin carried by the diaphragm, and a treadle connected with the bell-crank adapted to be moved for causing coincident closure of the fuel-control valve and registration of the apertures of the suction control valve member with said suction-pipes, said latch-pin moving into engagement with the notched piston-rod while the brake rods move to inoperative position.

6. In brake rod appliances for a motor vehicle provided with an intake manifold, a fuel-control valve and spring-controlled means for normally moving the brake rods to inoperative position, a brake-cylinder provided with a piston, a diaphragm-cylinder in communication with the intake manifold and provided with a diaphragm, a piston rod for said piston connected with the brake rods and provided with notches at longitudinal intervals, a valve-housing, suction-pipes opening on the valve-housing and leading to the intake manifold and brake-cylinder, a spring-controlled latch-pin carried by said diaphragm for engaging a selected notch of the piston-rod, a spring-controlled bell-crank connected with the fuel-control valve, a hollow valve-member provided with opposed apertures in the valve-housing having a rod mounted on the bell-crank, and a treadle connected with the spring-controlled bell-crank adapted to be moved in one direction for moving the bell-crank and arranged to be moved in a reverse direction by action of said bell-crank.

7. In brake rod appliances for a motor vehicle provided with an intake manifold and a fuel-control valve and spring-controlled means normally moving the brake rods to inoperative position, a brake-cylinder provided with a piston, a diaphragm-cylinder in constant communication with the intake manifold and provided with a diaphragm, a piston rod for the piston of the brake cylinder connected with the brake rods and provided with a notch, a spring-controlled latch-pin carried by the diaphragm and engaging the notch of the piston rod, a valve-housing, suction-pipes opening on the chamber of the valve-housing normally in communication with each other and leading to the intake manifold and brake-cylinder, a bell-crank connected with the fuel-control valve, a hollow suction control valve-member disposed in the valve housing having a rod mounted on the bell-crank and provided with opposed apertures and recesses opening on its periphery and said apertures, and a treadle connected with the bell-crank adapted to be moved in one direction for moving the bell-crank, the fuel-control valve moving to open position and the latch-pin moving to detached position from said notch, said treadle being movable in a reverse direction, said fuel-control valve moving to closed position and said suction-control valve-member moving to dispose its apertures in register with the suction-pipes.

BERNARD E. HOWELL.
WALTER S. McKNIGHT.